United States Patent [19]

Possati et al.

[11] Patent Number: 4,993,163
[45] Date of Patent: Feb. 19, 1991

[54] GAUGE FOR CHECKING LINEAR DIMENSIONS OF MECHANICAL PIECES

[75] Inventors: Mario Possati, Bologna; Narciso Selleri, Monteveglio; Guido Golinelli, Bologna, all of Italy

[73] Assignee: Marposs Societa' per Azioni, S. Marino di Bentivoglio, Italy

[21] Appl. No.: 498,477

[22] Filed: Mar. 23, 1990

Related U.S. Application Data

[60] Continuation of Ser. No. 238,177, Aug. 30, 1988, abandoned, which is a division of Ser. No. 453,108, Dec. 27, 1982, Pat. No. 4,787,149.

[30] Foreign Application Priority Data

Jan. 15, 1982 [IT] Italy .................. 3307 A/82

[51] Int. Cl.$^5$ .................. G01B 7/00
[52] U.S. Cl. .................. 33/542; 33/558; 33/555.1
[58] Field of Search .......... 33/542, 542.1, 543, 33/544, 555.1.501.08, 501.09, 501.50, 783, 784, 558

[56] References Cited

U.S. PATENT DOCUMENTS

| | | |
|---|---|---|
| 2,239,981 | 4/1941 | Terry et al. .................. 33/178 E |
| 2,419,461 | 4/1947 | Neff .................. 33/178 E |
| 3,922,792 | 12/1975 | Ito .................. 33/542 |
| 4,030,202 | 6/1977 | Fadl et al. .................. 33/542 |
| 4,339,879 | 7/1982 | Selleri .................. 33/501.09 |
| 4,364,177 | 12/1982 | Possati et al. .................. 33/501.50 |
| 4,386,467 | 6/1983 | Possati et al. .................. 33/542 |
| 4,787,149 | 11/1988 | Possati et al. .................. 33/542 |

FOREIGN PATENT DOCUMENTS

| | | |
|---|---|---|
| 40-19204 | 7/1965 | Japan . |
| 47-37559 | 12/1972 | Japan . |
| 50-37557 | 7/1975 | Japan . |
| 52-29758 | 3/1977 | Japan . |
| 52-149557 | 12/1977 | Japan . |
| 56-109438 | 1/1981 | Japan . |
| 2055470 | 3/1981 | United Kingdom . |
| 2055471 | 3/1981 | United Kingdom . |

OTHER PUBLICATIONS

Soled, *Fasteners Handbook*, "Heli-Coli ®Screw-Lock Insert", 1950, p. 50.

*Primary Examiner*—Harry N. Haroian
*Attorney, Agent, or Firm*—Stevens, Davis, Miller & Mosher

[57] ABSTRACT

Gauge for checking linear dimensions of mechanical pieces comprising a support, two arms movable with respect to the support, two feelers respectively fixed to the arms for contacting the piece to be checked and a position transducer having two mutually movable elements respectively fixed to the movable arms. At least one of the two elements of the transducer is fixed to the relevant movable arm by screw, nut-screw coupling and between the screw and the nut-screw there is arranged a thread insert, having at least one polygonal coil, which permits adjustment of the mutual position of the elements of the transducer, while assuring a stable adjustment.

8 Claims, 2 Drawing Sheets

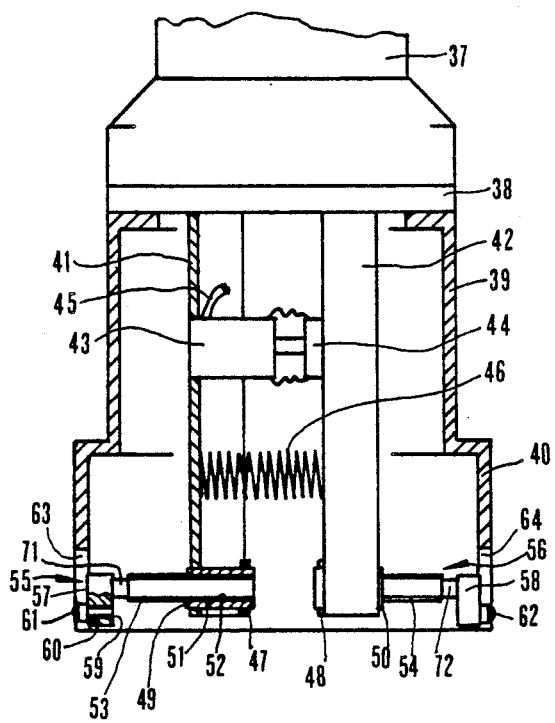
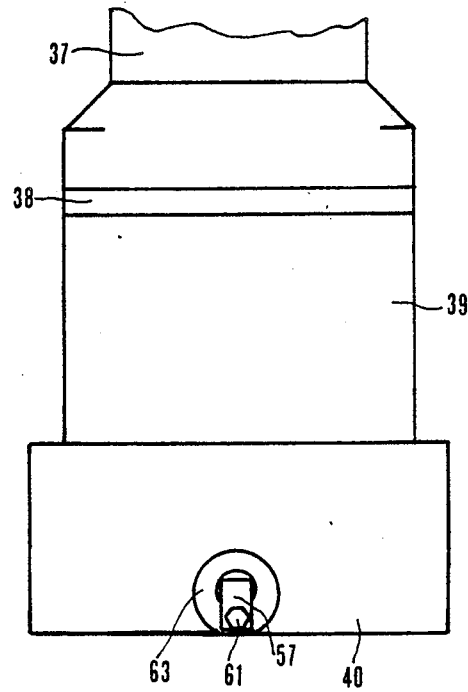
FIG. 6  FIG. 7
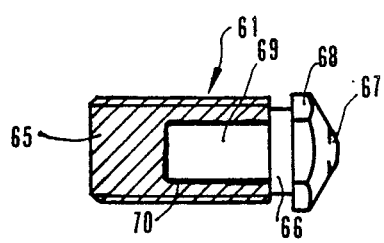
FIG. 8

GAUGE FOR CHECKING LINEAR DIMENSIONS OF MECHANICAL PIECES

This application is a continuation of application Ser. No. 238,177, filed Aug. 30, 1988 abandoned, which is a divisional of application Ser. No. 453,108, filed Dec. 27, 1982. Now U.S. Pat. No. 4,787,149.

The present invention relates to a gauge for checking linear dimensions of mechanical pieces, with a support, at least an arm that is movable with respect to the support along a measurement direction, a feeler element associated with the movable arm in order to touch a piece to be checked, a position transducer with two reciprocally movable elements, one of the two transducer elements being coupled to the movable arm, the transducer being adapted to provide a signal responsive to the dimension of the checked piece, and mechanical zero-setting means including a screw and nut screw zerosetting device for zero-setting the transducer signal, by adjusting the mutual position of the two transducer elements.

Gauges are already known for checking linear dimensions of mechanical pieces. These gauges have mechanical zero-setting devices for adjusting the position of the feeler element with respect to the associated movable arm and/or the mutual position of the two transducer elements, so that the transducer signal has approximately a prefixed value in coincidence with a determined dimension of the pieces to be checked.

A gauge of this type is described in U.S. Pat. No. 1,928,457.

It is also known that zero-setting operations are quite frequently carried out and consequently it is important that the gauges have mechanical zero-setting devices providing easy, rapid and steady adjustments. In the known gauges these characteristics are not satisfactorily met.

An object of the present invention is to provide a gauge equipped with a mechanical zero-setting device that can be easily and quickly operated and guarantees steady adjustments, even after a high number of adjustment operations.

This and other objects and advantages, that will become more evident in the following detailed description, are attained through a gauge of the type formerly described, wherein, according to the invention, the zero-setting device includes a thread insert, per se known, located between the screw and nut-screw, the thread insert having at least a friction coil to ensure a stable zero-setting.

In the accompanying drawings, given by way of non-limiting example, there are shown two preferred embodiments of the invention.

FIG. 6 is a partially sectional view of a plug gauge, according to another preferred embodiment of the invention, for checking the diameter of holes of mechanical pieces, particularly suitable for checking large size diameters, for example, larger than 100 mm;

FIG. 7 is an elevational view of the plug gauge shown in FIG. 6, according to a perpendicular direction with respect to the projection direction of FIG. 6; and FIG. 8 is an enlarged scale partly cut-away view of a detail of the plug gauge shown in FIGS. 6 and 7.

Figure 1:
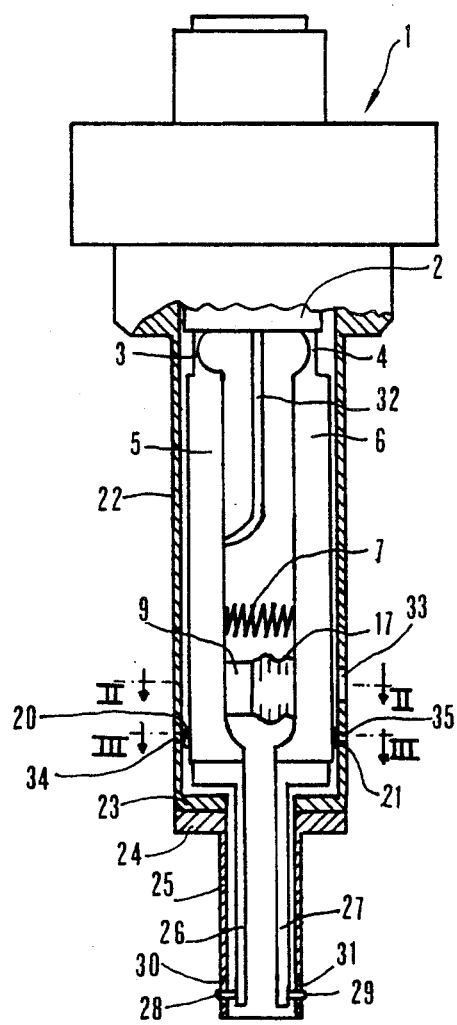
FIG. 1 is a partly cut-away sectional view of a plug gauge, according to a first embodiment of the invention, for checking the diameter of holes of mechanical pieces, particularly suitable for checking very small diameters, for example, smaller than 15 mm.
Figure 2:
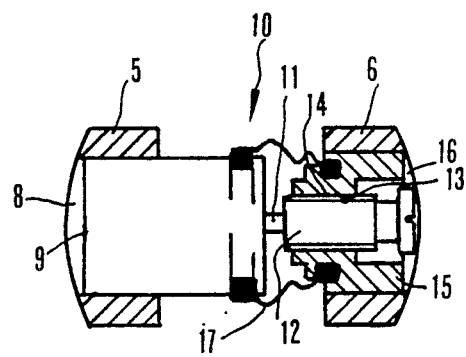
FIG. 2 is an enlarged scale view of a part of the plug gauge shown in FIG. 1, viewed along line II—II in FIG. 1.
Figure 3:
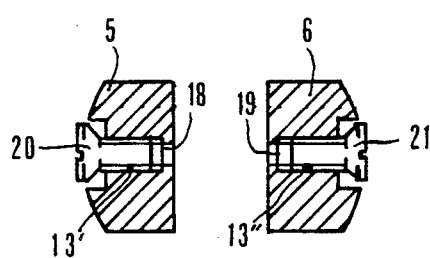
FIG. 3 is an enlarged scale view of another part of the plug gauge shown in FIG. 1, viewed along line III—III in FIG. 1.

FIGS. 1 to 3 illustrate a plug gauge suitable for applications on transfer machines. The gauge, that is mounted on a movable slide—not shown—includes an upper base 1 to which there is coupled a member or support 2 that supports, by means of two portions 3 and 4, two movable arms 5 and 6. Portions 3 and 4 have two sections of smaller thickness, resiliently flexible, that define two axes of rotation for arms 5 and 6.

Between arms 5 and 6 there is placed a compression spring 7, that biases apart arms 5 and 6.

In a hole 8 of arm 5 there is located a support member or element 9 that houses the windings of an inductive transducer 10 of a differential transformer type. Transducer 10 includes a second member or element, consisting of a support stem 11 carrying a magnetic core, not shown in the drawings, movable within the windings housed within member 9.

Figures 4, 5:
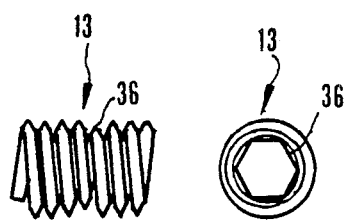
FIG. 4 is a longitudinal view of a thread insert, per se known, applied to a zero-setting device of the plug gauge shown in FIGS. 1-3.
FIG. 5 is a side view of the thread insert shown in FIG. 4.

Stem 11 is fixed to a screw having the form of a threaded cylinder 12 coupled—by means of a thread insert 13, shown in FIGS. 4 and 5—to a nut-screw 14 obtained in an element that consists of a bushing 15 housed in a hole 16 of arm 6.

Member 9 and bushing 15 are brazed to arms 5 and 6 respectively. To member 9 and bushing 15 there are fixed the ends of a flexible bellows-shape rubber gasket 17.

Arms 5 and 6 have two other nut-screws, i.e. threaded holes 18 and 19 wherein there are housed two screws 20 and 21. Between screws 20 and 21 and the threads of holes 18 and 19 there are placed two thread inserts 13', 13", similar to the thread insert 13 shown in FIGS. 4 and 5.

The heads of screws 20 and 21 act as limit devices, in that they can abut against limit stop surfaces defined by the internal wall of a cylindrical protective casing 22 fastened to base 1.

Casing 22 has a bored lower base 23 to which there is fixed a flange 24 of a protection nosepiece 25.

At the lower ends of arms 5 and 6 there are fixed two extensions 26 and 27 that carry at their ends two feelers 28 and 29 passing through holes 30 and 31 of nosepiece 25 for touching two diametrically opposite points of the workpices hole that one wishes to check.

A cable 32 connects transducer 10 to an electric power supply and detecting unit, not shown in the drawings.

The plug gauge mechanical zero-setting is carried out by adjusting—by means of a screwdiver, that passes through a hole 33 in casing 22—the axial position of cylinder 12 that carries stem 11 and the core of transducer 10, in such a way that the transducer output signal approximately reaches zero value when feelers 28 and 29 contact, at diametrically opposite points, the surface of a hole with a diameter equal to the nominal value. One can then carry out an electrical zero-setting (by means of a potentiometer, not shown) in order to bring the signal of transducer 10 exactly to zero value.

The stroke amount that feelers 28 and 29 travel, starting from their rest condition up to the zero-setting condition, can be set by adjusting screws 20 and 21 by means of a screwdriver inserted through holes 34 and 35 of casing 22.

Thread inserts 13, 13' and 13" are of a per se known type and have the shape of a steel spring with two concentric extremely accurate threads, an outer one and an inner one, adapted to engage a nut-screw and a screw. Moreover the thread inserts 13, 13' and 13" have at least a hexagonal coil 36 that, by urging against the thread of the screw and nut-screw, ensures that the adjustments of transducer 10 or of screws 20 and 21 are steady.

Resilient thread inserts suitable for the application according to the invention are "Heli-Coil" (registered trademark) "Screw-Lock" type inserts distributed in Italy by Celada Fasteners S.p.A. in Milan.

In FIGS. 6 and 7 there is shown a hand applied plug gauge with a handle 37, coupled to a support ring 38 that also supports a protective casing 39 with a nosepiece 40. To ring 38 there is also coupled an armset, partially shown in FIG. 6, partly in elevation and partly in section, including a member with two movable arms 41 and 42 obtained from a single piece of shaped and stamped plate. An armset similar to that shown in FIG. 6 is described in the U.S. Pat. No. 4,348,814.

Two reciprocally movable elements 43 and 44 of a position transducer are fixed to movable arms 41 and 42. The position transducer is connected by means of a cable 45 to a power supply and detecting unit, not shown in the drawings. A compression spring 46 placed between arms 41 and 42 biases apart the arms.

Arms 41 and 42 have C-shaped cross-sections and bent end wings 47 and 48. Through holes formed in the central sides of the C-shaped sections of arms 41 and 42 and in wings 47 and 48 there are inserted small cylinders 49 and 50, that are brazed to arms 41 and 42. Cylinders 49 and 50 have an internal nut-screw or thread which engages—by means of a thread insert 52, similar to thread insert 13 shown in FIGS. 4 and 5—screws consisting of threaded rods 53 and 54 of extension elements 55 and 56 including portions 57 and 58 that are perpendicular to rods 53 and 54. Portions 57 and 58 have threaded holes 59 providing nut-screws for engaging—by means of thread inserts 60, similar to thread 13 shown in FIGS. 4 and 5—feeler elements 61 and 62 that pass through holes and 64 of nosepiece 40. Feeler elements 61 and 62 are substantially movable in a radial direction, perpendicularly to the geometrical longitudinal axis of the plug gauge and to portions 57 and 58.

One of the feeler elements 61 is shown in detail in FIG. 8. Element 61 includes a first portion, i.e. a screw or threaded stem 65 made of steel and a second portion, i.e. a feeler body 66 made of sintered material, like carbide. Body 66 includes an end cap 67 that defines the actual feeler, a hexagonal head part 68 and a rod 69 that is brazed into a hole 70 of stem 65.

In order to adapt the plug gauge for the checking of holes of different diameter size it is necessary to use a nosepiece 40 of a suitable external diameter and feeler elements 61 and 62 of an appropriate length (they can be obtained by properly cutting stems 65 of semifinished parts) and to perform the zero-setting of the plug gauge.

The zero-setting operations are performed by adjusting the position of the feeler elements 61 and 62 in the measurement direction by using a key to turn the hexagonal heads 68 and by turning the extension elements 55 and 56, together with the feeler elements 61 and 62, about the geometrical axis passing through rods 53 and 54. The second operation, that is accomplished by using a key that can cooperate with portions 71 and 72 of rods 53 and 54, serves to arrange the feeler elements 61 and 62 in a diametral direction of the hole to be checked.

The dimensions of thread inserts 52 and 60 and those of the threaded parts engaged by them are chosen in such a way that the torque required for the adjustment of the feeler elements 61 and 62 is less than that required for adjusting the extension elements 55 and 56.

The structure of the feeler elements shown in FIG. 8 is particularly advantageous in that the hexagonal heads 68 can be made of extremely resistant material, so preventing their deformation even if the dimensions of the heads are very small and repeated adjustments are carried out. At the same time it is possible to manufacture stems 65 of a softer material, with respect to that of heads 68, so allowing the threading of stems 65 to be sufficiently accurate to ensure proper matching with thread inserts 60 and also allowing cutting of stems 65 for adapting them to check different diameter sizes.

A further advantage of the zero setting devices hereinbefore described, apart from simplicity, rapidity and stability of the adjustments, consists in smaller overall dimensions.

It is obvious that the same or similar zero-setting devices can be applied to gauges with just a movable arm, and associated feeler element.

What is claimed is:

1. A gauge for checking linear dimensions of mechanical pieces, comprising a support, at least an arm that is movable with respect to the support along a measurement direction, a feeler element associated with the movable arm in order to touch a piece to be checked, a position transducer with two reciprocally movable elements, one of the two transducer elements comprising a threaded part and being coupled to the movable arm, the transducer being adapted to provide a signal responsive to the dimension of the checked piece, and mechanical zero-setting means including a screw and nut-screw zero-setting device, for zero-setting the transducer signal by adjusting the mutual position of the two transducer elements, the threaded part defining one of the screw and nut-screw of the device, the zero-setting device including a thread insert, located between the screw and the nut-screw, the thread insert having at least a friction coil to provide a stable zero-setting.

2. The gauge according to claim 1, wherein said thread insert comprises a steel spring with external and internal concentric threads, the steel spring including said friction coil, the friction coil having a polygonal shape.

3. The gauge according to claim 1, further comprising an additional screw, nut-screw and thread insert device, with at least a friction coil, the additional device including a further screw, a further nut-screw and a further thread insert, the further screw being secured to the movable arm through the further thread insert and the further nut-screw and acting as adjustable limit element for adjusting the stroke of the movable arm.

4. The gauge according to claim 1, wherein one of the two transducer elements includes a support with electrical windings and the other transducer element includes a second support with a magnetic core, wherein the zero-setting device, enabling the adjustment of the position of the two transducer elements, is associated with the second support.

5. The gauge according to claim 1, wherein the zero-setting means further include a second screw and nut-screw zero-setting device, for adjusting the position of the feeler element with respect to the movable arm, said second zero-setting device comprising a second screw, a second nut-screw and a second thread insert located between the second screw and the second nut-screw, the second thread insert having at least a friction coil.

6. A plug gauge for checking internal diameters of mechanical pieces, comprising a support, two arms movable with respect to the support, two feelers respectively fixed to the movable arms for contacting the piece to be checked, a position transducer including two elements respectively secured to the movable arms for providing a signal representative of the mutual position of the feelers, at least one of the elements having a threaded part, and mechanical zero-setting means including a zero-setting device for zero-setting the position transducer, the zero-setting device adjustably securing one of said elements of the transducer to the relevant movable arm and including a screw and a nut-screw, the threaded part defining one of said screw and nut-screw, the zero-setting device further comprising a thread insert, the thread insert including at least a friction coil and being arranged between the screw and the nut-scew, for permitting stable adjustment of the screw with respect to the nut-screw and consequent adjustment of said transducer element with respect to the relevant movable arm.

7. The plug gauge according to claim 6, wherein the zero-setting means further include two supplemental zero-setting devices for adjustably securing the feelers to the movable arms, each of the supplemental zero-setting devices including a supplemental screw, a supplemental nut-screw and a supplemental thread insert arranged between the supplemental screw and the supplemental nut-screw, the supplemental thread insert having at least a friction coil.

8. A gauge for checking linear dimensions of mechanical pieces, comprising
a support,
at least an arm that is movable with respect to the support along a measurement direction,
a feeler element including a first threaded portion coupled to the movable arm by means of a threaded coupling, and a second portion made of considerably harder material than that of the first portion, the second portion being fixed to the first portion and including an end feeler adapted for touching the piece to be checked and a part adapted for allowing the adjustment of the feeler element by means of a tool,
a position transducer with two reciprocally movable elements, one of the two transducer elements having a threaded part and being coupled to the movable arm, the transducer being adapted to provide a signal responsive to the dimension of the checked piece, and
mechanical zero-setting means for zero-setting the gauge with
a first screw and nut-screw zero-setting device for adjusting the mutual position of the two transducer elements and comprising said threaded part which defines the screw and a portion integral with the arm which defines the nut screw, and
a second screw and nut-screw zero-setting device for adjusting the position of the feeler element with respect to the movable arm, each of said zero-setting devices including a thread insert, located between the screw and the nut-screw, the thread insert comprising a steel spring with external and internal concentric threads, the steel spring including at least a friction coil to provide a stable zero-setting, the friction coil having a poligonal shape.

* * * * *